(12) United States Patent
Wu et al.

(10) Patent No.: US 12,081,152 B2
(45) Date of Patent: Sep. 3, 2024

(54) TRANSIENT CURRENT MANAGEMENT OF ELECTRIC MACHINE IN AN ELECTRIFIED VEHICLE

(71) Applicant: Ford Global Technologies, LLC, Dearborn, MI (US)

(72) Inventors: Ji Wu, Ann Arbor, MI (US); Yang Xu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 176 days.

(21) Appl. No.: 17/974,713

(22) Filed: Oct. 27, 2022

(65) Prior Publication Data

US 2024/0146227 A1  May 2, 2024

(51) Int. Cl.
*H03K 17/16* (2006.01)
*B60L 50/51* (2019.01)
*H02P 27/06* (2006.01)
*B60L 50/60* (2019.01)

(52) U.S. Cl.
CPC .............. *H02P 27/06* (2013.01); *B60L 50/51* (2019.02); *B60L 50/60* (2019.02); *B60L 2210/40* (2013.01)

(58) Field of Classification Search
CPC ....... H02P 27/06; B60L 50/60; B60L 2210/40
See application file for complete search history.

(56) References Cited

U.S. PATENT DOCUMENTS

| 10,351,002 B2 | 7/2019 | Saha et al. |
| 10,525,841 B2 | 1/2020 | Zhou et al. |
| 11,177,751 B2 | 11/2021 | Min et al. |
| 2017/0066333 A1* | 3/2017 | Kim ........................ B60L 50/16 |
| 2020/0210354 A1* | 7/2020 | Fayneh ................ G11C 29/025 |
| 2022/0094567 A1* | 3/2022 | Ou ........................... H04B 3/42 |
| 2022/0286099 A1* | 9/2022 | Kim .................... H03F 3/45183 |

FOREIGN PATENT DOCUMENTS

CN          103187906 B     3/2016

* cited by examiner

*Primary Examiner* — Muhammad S Islam
(74) *Attorney, Agent, or Firm* — David B. Kelley; Brooks Kushman PC

(57) ABSTRACT

An electrified vehicle includes a traction battery, an inverter coupled to the traction battery via positive and negative legs of a high voltage bus and operable to convert DC power from the traction battery to three-phase AC power, a capacitor connected across the positive and negative legs of the high voltage bus, an electric machine having three phases coupled to the inverter, and a controller programmed to control electric machine voltage toward zero at a first slew rate or control electric machine current to a target short circuit current at a second slew rate in response to an active short request signal and to control the inverter to actively short the three phases of the electric machine after either (a) a specified elapsed time, or (b) after the electric machine voltage is below a first threshold or the current is within a predetermined range of the target short circuit current.

20 Claims, 5 Drawing Sheets

TRANSIENT CURRENT MANAGEMENT OF ELECTRIC MACHINE IN AN ELECTRIFIED VEHICLE

TECHNICAL FIELD

This disclosure relates to the control of an electrified vehicle to manage transient current of an electric machine during an inverter-controlled active short of the electric machine.

BACKGROUND

An electrified vehicle such as a hybrid-electric vehicle (HEV) or all-electric vehicle (EV) may be propelled by a DC high-voltage (HV) battery supplying power to an AC permanent magnet (PM) electric machine. An inverter may be used to convert the DC power from the battery into AC power for the electric machine. A DC link capacitor may be connected between positive and negative legs of the HV bus. The electric machine may operate as a generator and store energy in the HV battery. If the battery becomes disconnected with the electric machine rotating, such as may occur if the HV battery contactor opens or in various other situations, the inverter may be controlled to provide an active short circuit of the electric machine terminals by simultaneous activation of the upper transistors or lower transistors of the inverter for all phases of the electric machine so that the DC link capacitor is not subjected to the voltage induced by the rotating electric machine. This may generate a high transient current that could affect magnetization of the permanent magnets of the electric machine resulting in reduced performance and efficiency of the electric machine.

SUMMARY

In one or more embodiments, an electrified vehicle includes a traction battery, an inverter coupled to the traction battery via positive and negative legs of a high voltage bus and operable to convert direct-current power from the traction battery to three-phase alternating-current power, a capacitor connected across the positive and negative legs of the high voltage bus, an electric machine having three phases coupled to the inverter, and a controller programmed to control electric machine voltage toward zero at a first slew rate or control electric machine current to a target short circuit current at a second slew rate in response to an active short request signal and to control the inverter to actively short the three phases of the electric machine after either (a) a specified elapsed time from the active short request signal, or (b) after the electric machine voltage is below a first threshold or the electric machine current is within a predetermined range of the calculated short circuit current.

The inverter may include a pair of transistors associated with each of the three phases, each pair of transistors connected in series across the positive and negative legs of the high voltage bus, each phase of the electric machine coupled between an associated one of the pairs of transistors, wherein the controller controls the transistors to simultaneously connect all three phases of the electric machine to only one of the positive leg or the negative leg of the high voltage bus. The controller may control the inverter to simultaneously connect all three phases of the electric machine together to actively short the electric machine. The specified elapsed time may vary based on rotational speed of the electric machine when the active short request signal is received, or may be based on a time constant of the electric machine, the time constant based on inductance and resistance of the electric machine. In various embodiments, the time constant corresponds to:

$$\tau = \frac{2L_d L_q}{R_s(L_d + L_q)}$$

where $\tau$ represents the time constant, $L_d$ represents a direct-axis inductance component, $L_q$ represents a quadrature-axis inductance component, and $R_s$ represents resistance of the electric machine. In one or more embodiments, the first slew rate varies based on the time constant. The controller may control the inverter to actively short the three phases of the electric machine after whichever of (a) and (b) occurs first.

In one or more embodiments, the controller slews a direct-axis voltage component of the electric machine voltage toward zero at the first slew rate, and a quadrature-axis voltage component of the electric machine voltage toward zero at a third slew rate different from the first slew rate.

In one or more embodiments, the target short circuit current corresponds to a direct-axis target short circuit current component and a quadrature-axis target short circuit current component corresponding to:

$$i_{d\_ss}^{e} = -\omega_e^2 L_q \lambda_{pm}/(\omega_e^2 L_d L_q + R_s^2) \text{ and}$$

$$i_{q\_ss}^{e} = -R_s \omega_e \lambda_{pm}/(\omega_e^2 L_d L_q + R_s^2)$$

where $i_{d\_ss}^{e}$ represents the direct-axis component target of the electric machine current, $i_{q\_ss}^{e}$ represents the quadrature-axis component target of the electric machine current, $\omega_e$ represents angular rotational speed of the electric machine, $L_q$ represents a quadrature-axis inductance component of the electric machine, $L_d$ represents a direct-axis inductance component of the electric machine, $R_s$ represents resistance of the electric machine, and $\lambda_{pm}$ represents a flux linkage of permanent magnets in the electric machine.

In various embodiments, the controller slews a direct-axis component of the electric machine current to the direct-axis component short circuit target current at the second slew rate, and a quadrature-axis component of the electric machine current to the quadrature-axis component target short circuit current at a fourth slew rate different from the second slew rate.

Embodiments according to the disclosure include a method for controlling an electrified vehicle having an inverter configured to power an electric machine from a traction battery, the method comprising, by a vehicle controller, controlling the inverter to actively short the electric machine after either a specified elapsed time from receiving an active short request signal, or after completion of electric machine conditioning, the electric machine conditioning including slewing one of electric machine voltage and electric machine current to a respective active short target voltage or active short current target. Slewing the electric machine voltage may include slewing a direct-axis voltage component at a first slew rate and a quadrature-axis voltage component at a second slew rate toward zero voltage, the second slew rate different than the first slew rate. The specified elapsed time may be based on rotational speed of the electric machine when the active short request signal is received. The first slew rate and the second slew rate may be based on a time constant associated with at least inductance and resistance of the electric machine. In various embodiments, the specified elapsed time is based on either rotational speed of the electric machine or a time constant associated with at least inductance and resistance of the electric machine.

Various embodiments include a system having an inverter configured to power a three-phase electric machine from a high voltage battery and a controller programmed to control the inverter to simultaneously connect all phase windings of the electric machine together while the electric machine is rotating after a specified elapsed time, the specified elapsed time based on rotational speed of the electric machine or a time constant of the electric machine. The controller may be further programmed to simultaneously connect all phase windings of the electric machine together after completion of conditioning the electric machine if the completion occurs before the specified time has elapsed. Electric machine conditioning may include one of controlling electric machine voltage to zero or a target voltage near zero by slewing or following a specified trajectory, and controlling electric machine current to a target short circuit current by slewing or following a specified trajectory. The controller may be programmed to slew a direct-axis voltage component at a first slew rate and a quadrature-axis voltage component at a second slew rate different than the first slew rate. In various embodiments, the controller may be programmed to slew the electric machine current by slewing a direct-axis current component and a quadrature-axis current component at a third slew rate.

One or more embodiments according to the disclosure may have associated advantages. For example, embodiments may significantly reduce transient current peaks when the inverter is commanded to perform an active short circuit of the electric machine. Limiting transient current during an active short substantially reduces the possibility of the transient affecting subsequent performance of the electric machine associated with demagnetizing permanent magnets of the electric machine. Those of ordinary skill in the art may recognize additional advantages of one or more embodiments for particular applications or implementations that are not explicitly stated based on the teachings of the disclosure.

DETAILED DESCRIPTION

Embodiments of the present disclosure are described herein. It is to be understood, however, that the disclosed embodiments are merely examples and other embodiments can take various and alternative forms. The figures are not necessarily to scale and may be simplified; some features could be exaggerated, minimized, or omitted to show details of particular components. Therefore, specific structural and functional details disclosed herein are not to be interpreted as limiting, but merely as a representative basis for teaching one skilled in the art to variously employ the claimed subject matter. As those of ordinary skill in the art will understand, various features illustrated and described with reference to any one of the figures can be combined with features illustrated in one or more other figures to produce embodiments that are not explicitly illustrated or described, but within the scope of the claimed subject matter. The combinations of features illustrated provide representative embodiments for typical applications. Various combinations and modifications of the features consistent with the teachings of this disclosure, however, could be desired for particular applications or implementations.

Figure 1:
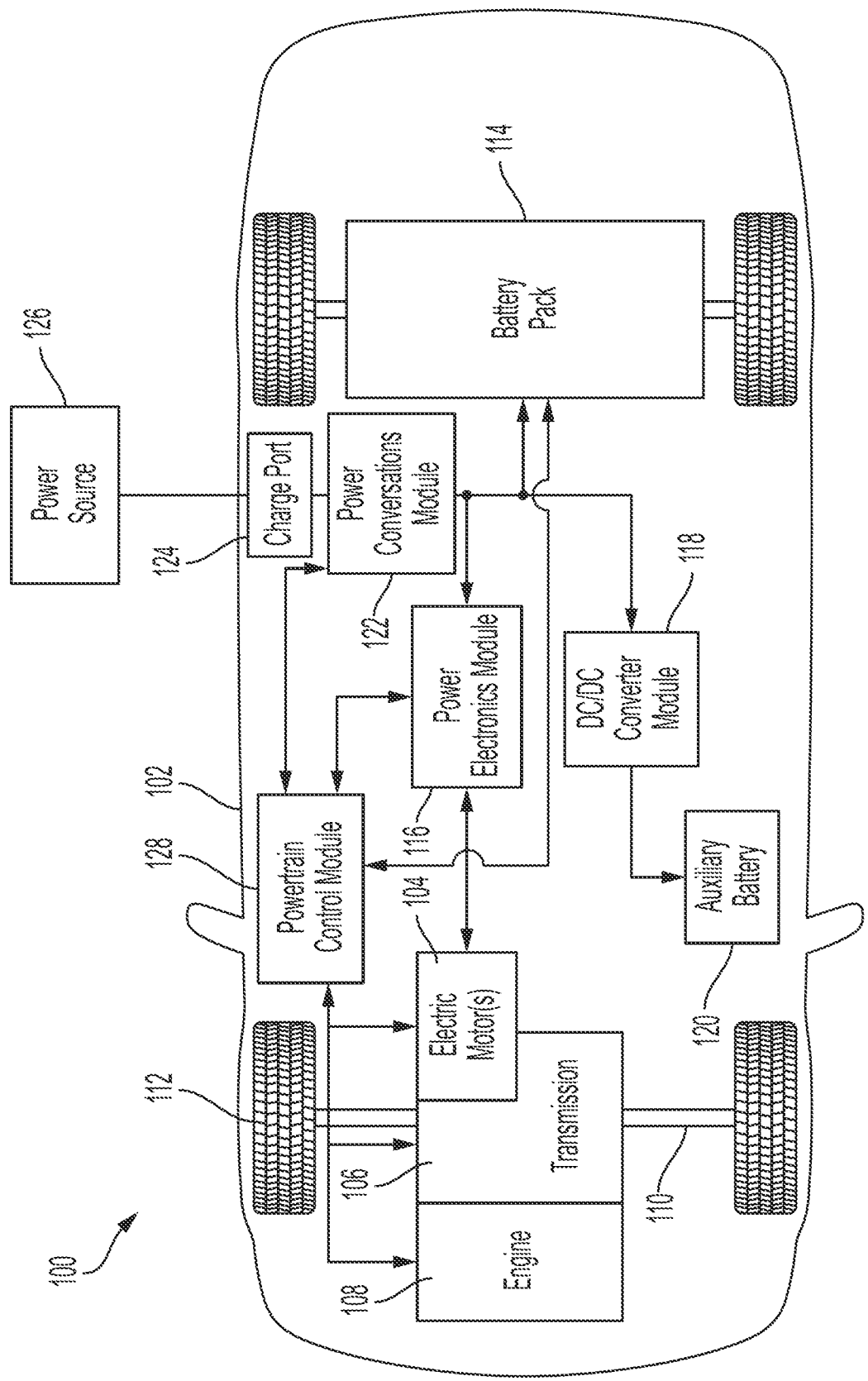
FIG. 1 is block diagram of an electrified vehicle implemented as a hybrid-electric vehicle.

FIG. 1 depicts an example of an electrified vehicle 100 implemented as a plug-in hybrid-electric vehicle. The electrified vehicle 100 may comprise one or more three-phase electric machines 104 mechanically connected to a transmission 106. Electric machines 104 may be conditioned prior to an inverter controlled active short to reduce transient current during the active short according to various embodiments as described herein.

Transmission 106 is mechanically connected to an engine 108 for hybrid implementations. The transmission 106 may also be mechanically connected to a drive shaft 110 that is mechanically connected to the wheels 112. The electric machines or motor/generators 104 can provide propulsion whether the engine 108 is turned on or off. The electric machines 104 may operate as motors, generators, or both and can provide fuel economy benefits by recovering energy that would normally be lost as heat. Electrified vehicle 100 may also be implemented as a battery electric vehicle without an engine 108 and powered solely by traction battery 114.

Traction battery or battery pack 114 stores energy that can be used by the electric machines 104. A vehicle battery pack 114 typically provides a high voltage (HV) DC output provided by connecting hundreds of low voltage cells together. The battery pack 114 is electrically connected to a power electronics module 116. The power electronics module 116 is also electrically connected to the electric machines 104 and provides the ability to bi-directionally transfer energy between the battery pack 114 and the electric machines 104. For example, a typical battery pack 114 may provide a DC voltage/current while the electric machines 104 may require a three-phase AC voltage/current. The power electronics module 116 may convert the DC voltage to a three-phase AC current as required by the electric machines 104 and may also be referred to as an inverter in various applications. Power electronics module 116 may also include a voltage converter that increases the DC voltage from the battery pack 114 supplied to the HV DC bus that powers the inverter. In a regenerative mode, the power electronics module 116 will convert the three-phase AC current from the electric machines 104 acting as generators to the DC voltage required to recapture energy in the battery pack 114.

In addition to providing energy for propulsion, the battery pack 114 may provide energy for other vehicle electrical systems. A typical system may include a DC/DC converter module 118 that converts the high voltage DC output of the battery pack 114 to a low voltage DC supply that is compatible with other vehicle loads. Other high voltage loads, such as compressors and electric heaters, may be connected directly to the high-voltage bus from the battery pack 114. In a typical vehicle, the low voltage systems are electrically connected to a 12V, 24V, or 48V battery 120.

The battery pack 114 may be recharged by an external power source 126. The external power source 126 may provide AC or DC power to the vehicle 102 by electrically connecting through a charge port 124. The charge port 124 may be any type of port configured to transfer power from the external power source 126 to the vehicle 102. The charge port 124 may be electrically connected to a power conversion module 122, sometimes referred to as a charger or charging module. The power conversion module may condition the power from the external power source 126 to provide the proper voltage and current levels to the battery pack 114. In some applications, the external power source 126 may be configured to provide the proper voltage and current levels to the battery pack 114 and the power conversion module 122 may not be necessary. The functions of the power conversion module 122 may reside in the external power source 126 in some applications. The vehicle engine, transmission, electric machines, battery, power conversion, power electronics, and various other control modules, components, or systems may be controlled by a powertrain control module (PCM) 128. Alternatively, or in combination, various systems or subsystems may include associated control modules or controllers in communication with PCM 128 over a vehicle wired or wireless network to provide coordinated control of the vehicle. As used in this disclosure, a controller generally refers to one or more control modules or controllers that may cooperate to perform a particular task or function and is not limited to a single controller or any particular dedicated controller or control module.

Figure 2:
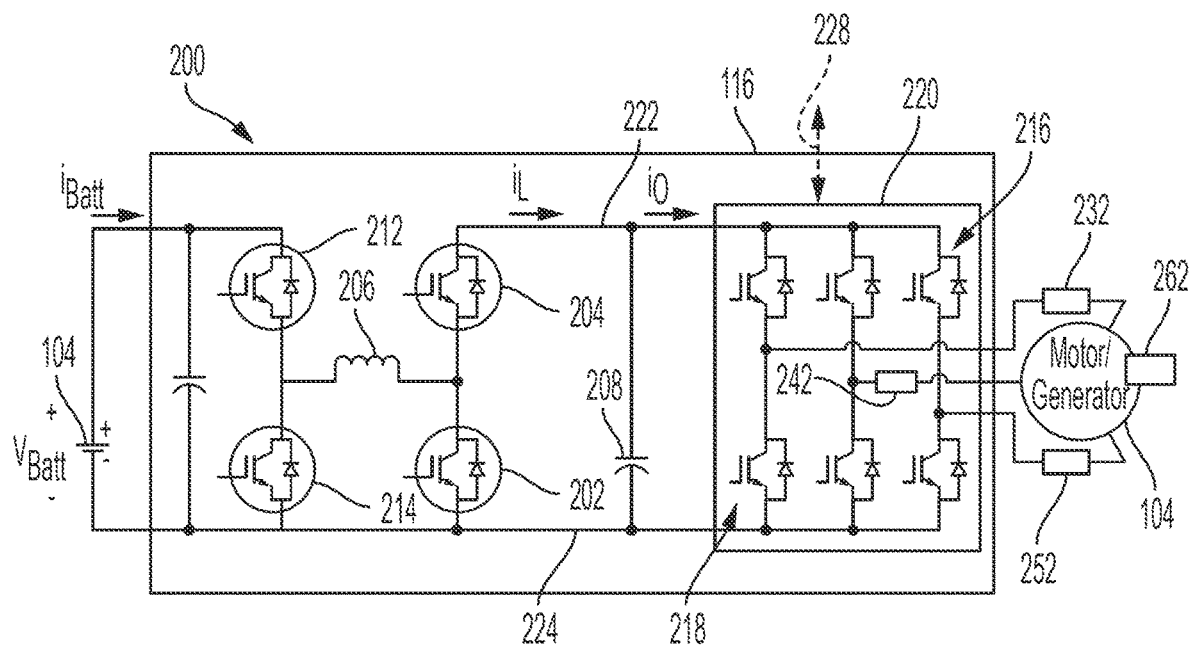
FIG. 2 is a block diagram illustrating connections between an HV traction battery and an electric machine (motor/generator) of a representative electrified vehicle.

FIG. 2 illustrates a traction battery 114 coupled via a positive leg 222 and negative leg 224 of the HV DC bus to a power electronics module 116, which is connected to a three-phase electric machine 104 in a representative electrified vehicle 100. One or more contactors or high voltage switches (not shown) controlled by an associated controller, such as powertrain control module 128, may be operated to selectively connect battery voltage from battery 114 to power electronics module 116 after completing various diagnostic routines in response to a vehicle start. These high voltage switches may be implemented by relays, insulated gate bipolar junction transistors (IGBTs), metal oxide semiconductor field effect transistors (MOSFETs), bipolar junction transistors (BJTs), and/or other electro-mechanical or solid state switches. The system may include a pre-charge circuit to limit the current flow from battery 114 while the system is powering up.

As recognized by the present inventors, if the battery contactor opens while the electric machines 104 are rotating, or another condition disconnects the battery pack 114 from the electric machines 104, the rotating electric machines may generate a large transient voltage on the HV DC bus. In response, the inverter 220 of power electronics 116 may be controlled to actively short the electric machine terminals by simultaneously turning on upper IGBTs 216 or lower IGBTs 218 so that the DC link capacitor 208 is not subjected to the voltage induced by PM motor. A sudden active short with the electric machines 104 rotating can induce a high transient current, particularly a high direct-axis component of the electric machine current that could adversely affect the permanent magnets of the electric machines 104. This could also result in a high transient of the quadrature-axis component of the motor current and associated torque disturbance. The transient response for a three phase active short may be characterized by the following voltage equations:

$$v_q^e = R_s i_q^e + L_q \frac{di_q^e}{dt} + \omega_e L_d i_d^e + \omega_e \lambda_{pm} \quad (1)$$

$$v_d^e = R_s i_d^e + L_d \frac{di_d^e}{dt} - \omega_e L_q i_q^e \quad (2)$$

When the voltage goes nearly instantaneously to zero during the three phase active short, the current may be represented by:

$$i_q^e(t) = i_{q\_ss}^e + C_q e^{-t/\tau} \cos(\varphi_q(t)) \quad (3)$$

$$i_d^e(t) = i_{d\_ss}^e + C_d e^{-t/\tau} \cos(\varphi_d(t)) \quad (4)$$

$$\tau = \frac{2 L_d L_q}{R_s (L_d + L_q)} \quad (5)$$

$\tau$ is the time constant

As represented by the above, if the voltage directly goes to zero, there is a large transient current response that could affect the permanent magnets or other components of the electric machine.

Embodiments according to the present disclosure condition the electric machine by controlling the electric machine voltage to a corresponding target, or the electric machine current to a corresponding target prior to the inverter performing the active short to reduce the transient current resulting from the inverter controlled active short.

Power electronics module 116 may include buck-boost converter circuitry 200 upstream of inverter components 220 to drive one or more electric machines 104. The power electronics module 116 may include a boost circuit with an inductor 206, a switch 212 to charge an electric field in the inductor 206, and a switch 214 to discharge the electric field and change the voltage to drive the motor/generator 104. This power electronics module 200 may also include a buck circuit using inductor 206 and switches 202 and 204. This voltage converter circuit will convert the battery voltage to an operational voltage which may be greater than the battery terminal voltage. The buck-boost power converter 200 may use IGBTs, BJTs, MOSFETs, relays, or other electro-mechanical or solid state switches. The use of IGBTs with Fast Recovery Diodes (FRDs) in this diagram is exemplary and may be accomplished using MOSFETs, BJTs, or other electro-mechanical or solid state switches. One or more capacitors, represented by DC link capacitor 208, may be used to filter the voltage generated by the voltage converter so that the operational voltage applied to the inverter 210 is generally stable. This buck-boost circuit is intended to change the voltage of a high voltage battery 114 (having a voltage greater than 60V DC), to an operating voltage different than the battery voltage. An example of this is a high voltage battery of 90-400 volts being changed to an operating voltage of 100-1200 volts.

As previously described, inverter 220 converts the DC voltage/current to a three-phase AC voltage/current provided to electric machine 104 by controlling operation of upper IBGTs 216 and lower IGBTs 218. As illustrated, each of the three phases of electric machine 104 is connected between an upper/lower pair of transistors, with each transistor pair connected in series across the positive leg 222 and negative leg 224 of the HV DC bus. As described in greater detail herein, inverter 220 communicates with an associated controller as indicated at 228 to condition electric machine 104 prior to performing an active short to reduce the associated transient current. The inverter conditions the electric machine by controlling the electric machine voltage to a target voltage, or controlling electric machine current to a target current in response to receiving an active short request signal or otherwise determining that an active short should be performed. After the conditioning is completed or after a specified elapsed time from receiving the active short request signal, the inverter shorts all phases of the electric machine 104 by controlling operation of the upper transistors 216 or the lower transistors 218. As described in greater detail with respect to FIG. 3, the voltage or current may be controlled to follow a specified trajectory or slew rate toward the respective target. The specified elapsed time period may be based on the rotational speed of the electric machine 104 or a time constant of the electric machine 104, for example.

System 200 may include various sensors to monitor and control operation of the inverter 220 and electric machine 104. For example, in various embodiments system 200 may include current sensors 232, 242, 252 associated with each phase of the electric machine 104. Electric machine 104 may include a resolver or other rotational position sensor 262 that provides a corresponding signal indicative of rotational position and rotational speed of the rotor of electric machine 104. The rotational position sensor 262 may be a resolver, encoder, speed sensor, or another position sensor that is associated with the electric machine 104. The sensor 262 monitors an angular or rotational position of the rotor (or shaft) of the electric machine 104. The sensor 262 may be mounted to or separate from the rotor. The sensor 262 communicates signals or information to one or more associated control modules or controllers that may determine the rotational or angular speed of the electric machine 104.

Figure 3:
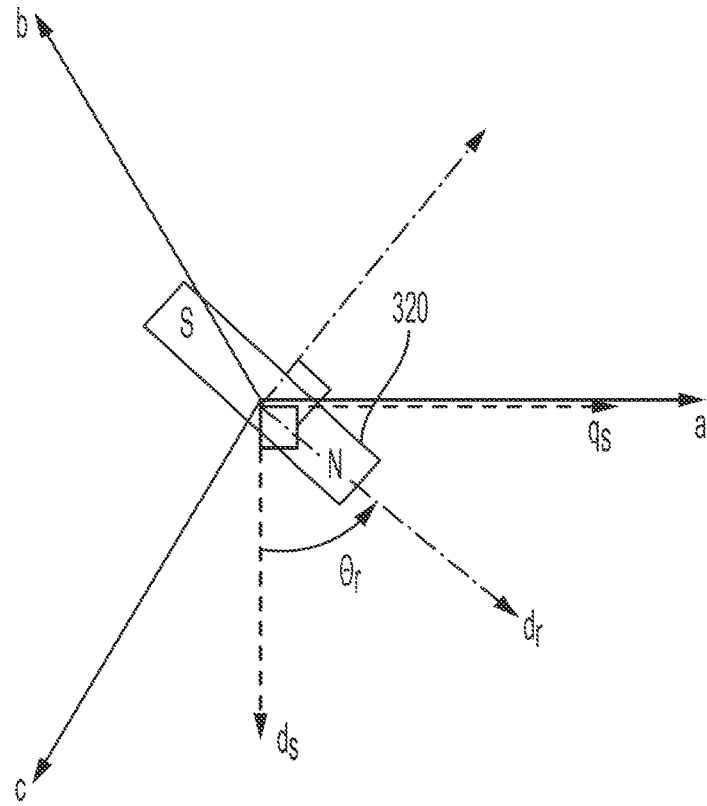
FIG. 3 is a diagram illustrating the relationship between a three-phase complex coordinate system and associated two-phase representations with direct and quadrature axes for electric machine conditioning prior to performing an inverter controlled active short.

FIG. 3 is a diagram illustrating the relationship between a three-phase complex coordinate system and associated two-phase representation with direct axis and quadrature axis components of the voltage/current for electric machine control according to one or more embodiments. Electric machines such as the motor/generator 104 include a rotor 320 that rotates within the magnetic field of a stator. The rotor can be mathematically represented relative to a three-phase stationary frame a, b, and c, or alternatively in two dimensions via a stationary direct (d), quadrature (q) frame and a rotating d, q frame. For example, the stationary d, q frame includes a direct axis $d_s$ and a quadrature axis $q_s$, and the rotating d, q frame includes a direct axis $d_r$ and a quadrature axis $q_r$. The rotating d, q frame is aligned with movement of the rotor 320. Therefore, $\theta_r$ represents an angular position of the rotor 320. The angular position $\theta_r$ of the rotor 320 may be used to calculate the instantaneous current commands $i_a$, $i_b$, and $i_c$ for each of the three-phases (a, b, c) to control torque of the electric machine 104. A signal representing the angular position of the rotor may be provided to the controller by an associated sensor 262 (FIG. 2).

Figure 4:
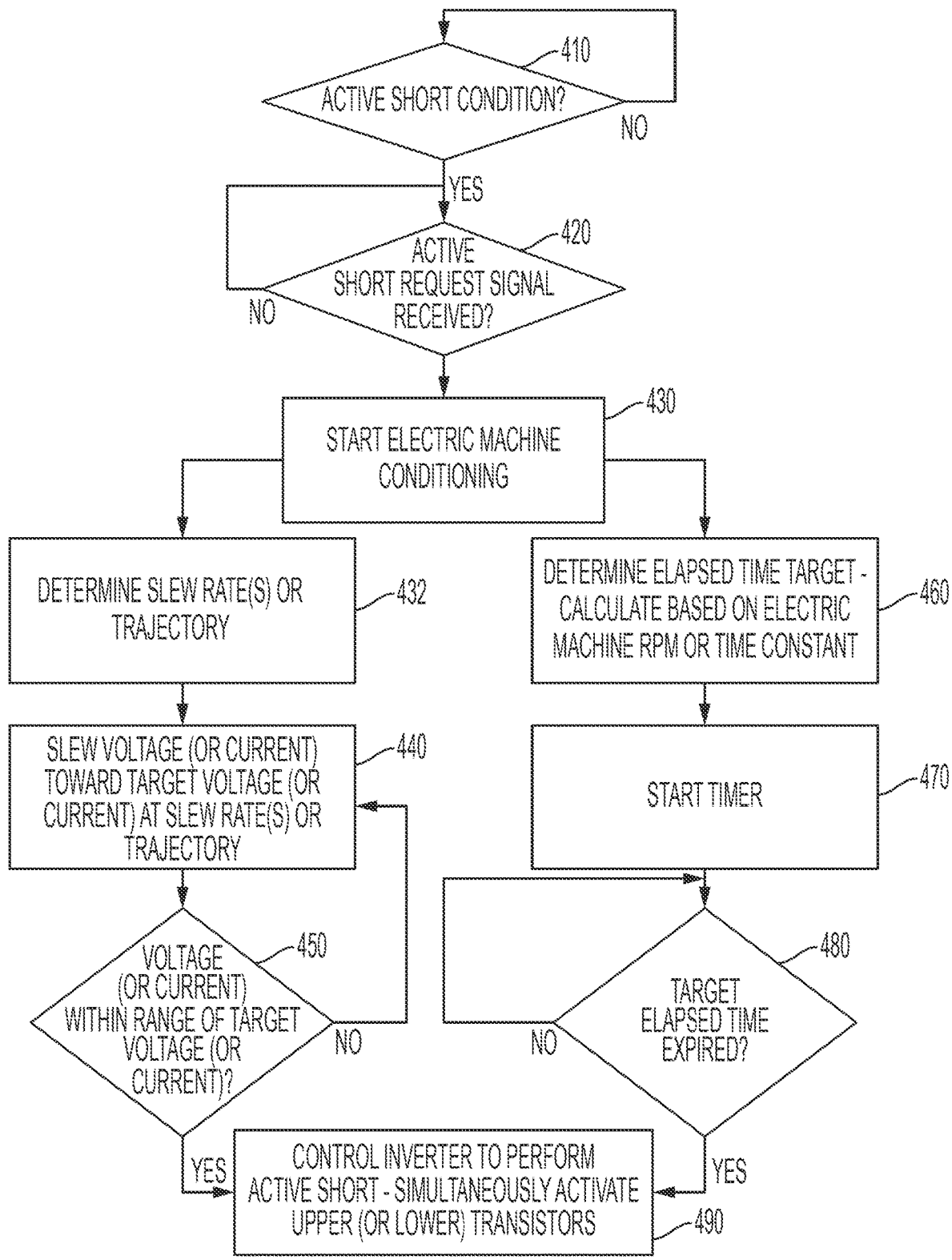
FIG. 4 is a block diagram illustrating operation of a system or method for conditioning an electric machine prior to performing an inverter controlled active short.

FIG. 4 is a flowchart illustrating operation of a system or method according to one or more embodiments of the disclosure. The processes, methods, or algorithms illustrated and described may be deliverable to/implemented by a processing device, processor, control module, controller, or computer, which can include any existing programmable electronic control unit or dedicated electronic control unit. Similarly, the processes, methods, or algorithms can be stored in non-transitory computer readable storage media as data and instructions executable by a controller or computer in many forms including, but not limited to, information permanently stored on non-writable storage media such as ROM devices and information alterably stored on writeable storage media such as RAM devices, FLASH devices, MRAM devices and other non-transitory optical media. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components. While the algorithms, processes, methods, or steps may be illustrated and/or described in a sequential matter, various steps or functions may be performed simultaneously or based on a trigger or interrupt resulting in a different sequence or order than illustrated and described. Some processes, steps, or functions may be repeatedly performed whether or not illustrated as such. Similarly, various processes, steps, or functions may be omitted in some applications or implementations.

Block 410 determines whether a condition has occurred to trigger an inverter controlled active short. The trigger condition may be determined by various vehicle controllers with a corresponding active short request signal sent to the inverter controller. As previously described, one condition that may trigger an inverter controlled active short includes a traction battery contactor opening while the electric machine is rotating. In response to receipt of the active short request signal at 420, the inverter controller initiates electric machine conditioning as represented at 430. One or more slew rates or trajectories for controlling electric machine voltage or current may be determined as represented at 432. Trajectories or slew rates may be retrieved from a lookup table stored in memory accessible by the controller. Alternatively, one or more trajectories or slew rates may be calculated based on an equation. In various embodiments, slew rates may be determined based on rotational speed of the electric machine. The resulting slew time may correspond to a certain percentage of one electrical cycle, for example. In one embodiment, a different slew rate is applied to the direct-axis component of the voltage or current than the slew rate applied to the quadrature-axis component of the voltage or current. In various embodiments, the slew rates have a relationship with the time constant of the electric machine, such as a certain percentage of the time constant, for example. The time constant may be determined according to:

$$\tau = \frac{2L_d L_q}{R_s (L_d + L_q)}$$

where τ represents the time constant, $L_d$ represents a direct-axis inductance component, $L_q$ represents a quadrature-axis inductance component, and $R_s$ represents resistance of the electric machine.

The inverter controller then controls the voltage (or current) to a corresponding target voltage (or current) as represented at 440.

In one embodiment, the inverter controller controls the electric machine voltage toward zero or a small value at the selected slew rate(s). As previously described, the slew rate for the direct-axis component of the voltage may be different from the slew rate for the quadrature-axis component of the voltage. When the direct axis and quadrature axis components are zero or near zero, the electric machine can be approximated as three phase shorted together, which prepares the electric machine for the inverter controlled active short state. For embodiments where electric machine voltage is controlled, block 450 determines whether conditioning is complete based on the direct and quadrature components being zero or within a predetermined range of zero.

In one embodiment, the inverter controller controls the electric machine current toward a target short circuit current using the selected slew rate(s) or trajectory. The target short circuit currents may be calculated according to:

$$i_{d\_ss}^{e} = -\omega_e^2 L_q \lambda_{pm}/(\omega_e^2 L_d L_q + R_s^2) \text{ and}$$

$$i_{q\_ss}^{e} = -R_s \omega_e \lambda_{pm}/(\omega_e^2 L_d L_q + R_s^2)$$

where $i_{d\_ss}^{e}$ represents the direct-axis current component target, $i_{q\_ss}^{e}$ represents the quadrature-axis current component target, $\omega_e$ represents angular rotational speed of the electric machine, $L_q$ represents a quadrature-axis component of inductance of the electric machine, $L_d$ represents a direct-axis component of inductance of the electric machine, $R_s$ represents resistance of the electric machine, and $\lambda_{pm}$ represents a flux linkage of permanent magnets in the electric machine.

For embodiments where electric machine current is controlled, block 450 determines whether conditioning is complete based on the direct and quadrature components of the current being within a predetermined range of the target short circuit current.

In response to receiving the active short request signal at 420, block 460 calculates or otherwise determines an elapsed time target as represented at 460. The elapsed time may be calculated or otherwise determined based on the rotational speed of the electric machine, the time constant of the electric machine, or various other factors. A timer is initiated as represented at 470 and block 480 determines whether the target elapsed time has passed from receiving the request signal for the active short.

Block 490 controls the inverter to start the active short condition after the shorter of the elapsed time has passed as indicated at 480 or the electric machine conditioning is complete as indicated at 450. As previously described, the inverter controlled active short may be performed by controlling the transistors coupled to the positive leg of the HV DC bus to "ON" to connect all phase terminals of the electric machine together. Alternatively, the inverter controller may control the transistors coupled to the negative leg of the HV DC bus to "ON" to connect all phase terminals of the electric machine together. The inverter controlled active short may be terminated in response to a corresponding termination request received by the controller or when rotational speed of the electric machine is below a corresponding threshold.

Figure 5A:
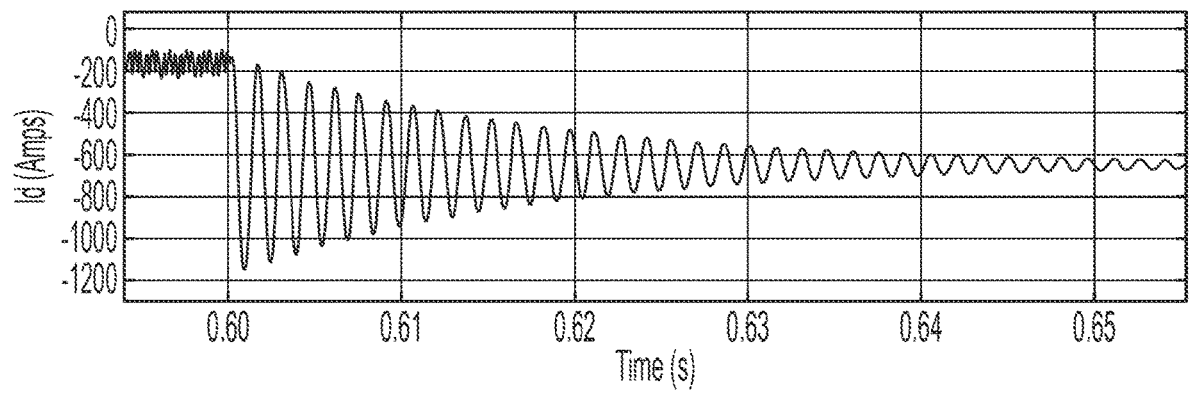
FIGS. 5A and 5B illustrate the direct-axis component and quadrature-axis component, respectively, of electric machine current during an inverter controlled active short without prior conditioning of the electric machine.
Figure 5B:
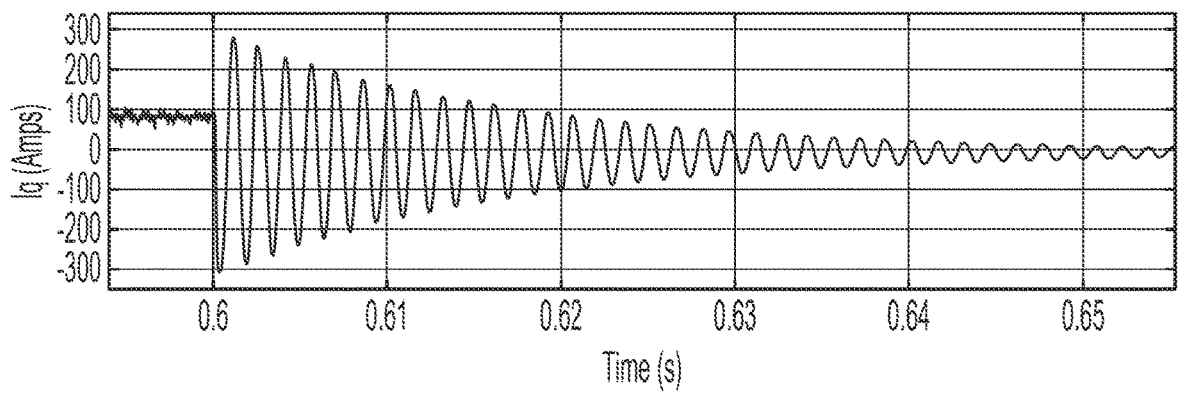

FIGS. 5A and 5B illustrate the direct-axis component and quadrature-axis component, respectively, of electric machine current during an inverter controlled active short without prior conditioning of the electric machine. As illustrated in FIGS. 5A and 5B, an inverter controlled active short at time t=0 results in a large transient current in both the direct-axis component (FIG. 5A) and the quadrature-axis component (FIG. 5B). After the initial spike in current, the current components ring and decay toward zero.

Figure 6A:
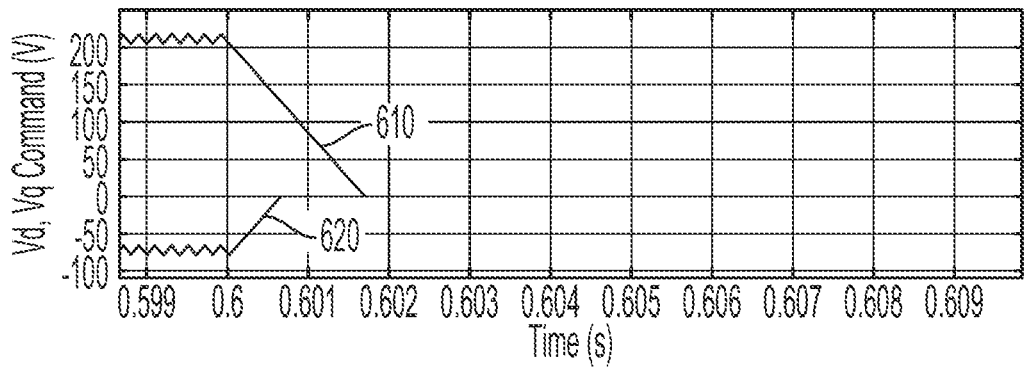
FIG. 6A illustrates electric machine conditioning by slewing of the direct-axis component and quadrature-axis component of electric machine voltage.

FIG. 6A illustrates electric machine conditioning by slewing of the direct-axis component and quadrature-axis component of electric machine voltage. The slew rate of 120 kV/s in this example is the same for both the quadrature-axis component 610 and the direct-axis component 620 beginning during conditioning of the electric machine at t=0.600s and slewing the voltage toward zero at about 0.6006s for component 620 and 0.6016s for component 610. The inverter commands the active short at 0.602s after the voltage commands have reached zero volts.

Figure 6B:
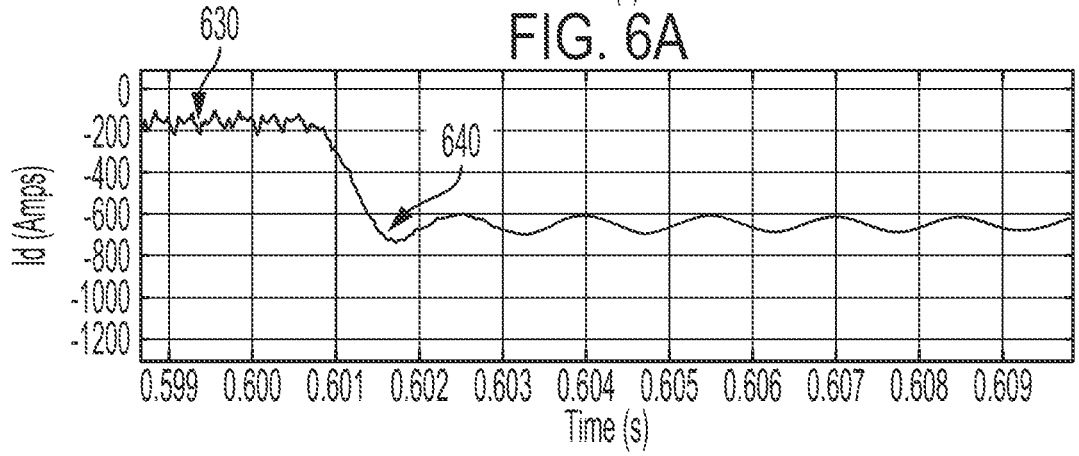
FIGS. 6B and 6C illustrate the direct-axis component and quadrature-axis component, respectively, of electric machine current during electric machine conditioning and an inverter controlled active short according to one or more embodiments of the present disclosure.
Figure 6C:
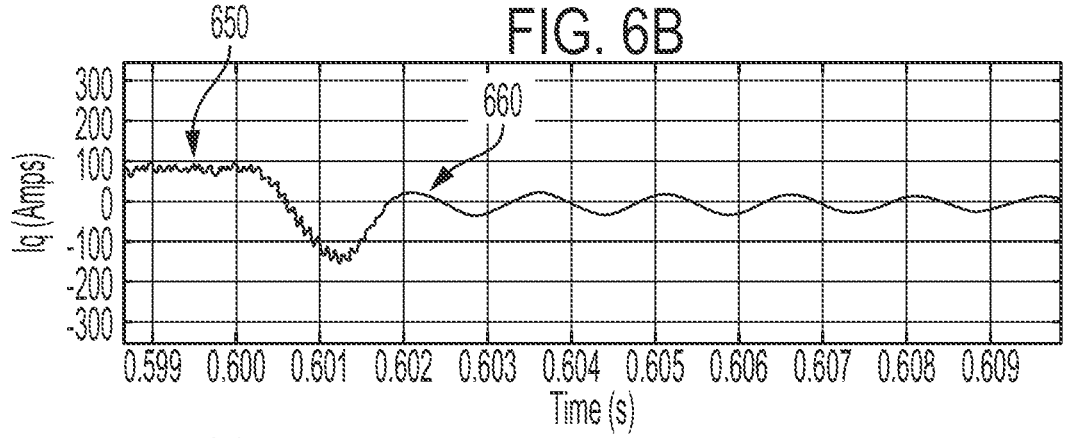

FIGS. 6B and 6C illustrate the direct-axis component and quadrature-axis component, respectively, of electric machine stator current during electric machine conditioning and an inverter controlled active short according to one or more embodiments of the present disclosure. As illustrated in FIG. 6B, electric machine conditioning by slewing electric machine voltage at 630 (as shown in FIG. 6A) results in the direct-axis component of the stator current of about −200 A moving toward the a calculated short circuit target of about −700 A at 640 with the inverter controlled active short initiated at 0.602s. Similarly, as shown in FIG. 6B, electric machine conditioning at 650 by slewing the electric machine voltage at 650 (as shown in FIG. 6A) results in the quadrature-axis component of the stator current moving from about 100 A to near 0 A at 660 with the inverter controlled active short initiated at 0.602s.

Figure 6D:
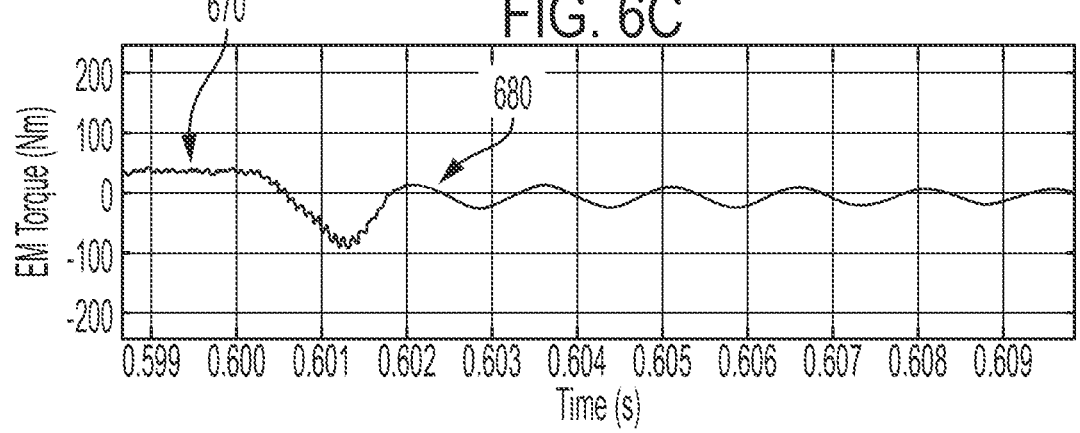
FIG. 6D illustrates electric machine torque during electric machine conditioning and an inverter controlled active short according to one or more embodiments of the present disclosure.

FIG. 6D illustrates electric machine torque during electric machine conditioning at 670 and an inverter controlled active short at 680 according to one or more embodiments of the present disclosure. As illustrated in FIG. 6D, electric machine torque decreases from about 30 Nm to near −100 Nm before returning to about 0 Nm prior to the initiating the inverter controlled active short at 0.602s.

As demonstrated by the representative embodiments described and illustrated herein, electric machine conditioning may significantly reduce transient current peaks when the inverter is commanded to perform an active short circuit of the electric machine. Limiting transient current during an active short substantially reduces or eliminates the possibility of the transient current affecting subsequent performance of the electric machine associated with demagnetizing permanent magnets of the electric machine.

The representative embodiments described are not intended to encompass all possible forms within the scope of the claims. The words used in the specification are words of description rather than limitation, and it is understood that various changes can be made consistent with the teachings of the disclosure within the scope of the claimed subject matter. As previously described, one or more features of various embodiments can be combined to form further embodiments that may not be explicitly described or illustrated. Although embodiments may have been described as providing advantages over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electrified vehicle comprising:
a traction battery;
an inverter coupled to the traction battery via positive and negative legs of a high voltage bus and operable to convert direct-current power from the traction battery to three-phase alternating-current power;
a capacitor connected across the positive and negative legs of the high voltage bus;
an electric machine having three phases coupled to the inverter; and
a controller programmed to:
control electric machine voltage toward zero at a first slew rate or control electric machine current to a target short circuit current at a second slew rate in response to an active short request signal; and
control the inverter to actively short the three phases of the electric machine after either (a): a specified elapsed time from the active short request signal, or (b): after the electric machine voltage is below a first threshold or the electric machine current is within a predetermined range of the calculated short circuit current.

2. The electrified vehicle of claim 1 wherein the inverter includes a pair of transistors associated with each of the three phases, each pair of transistors connected in series across the positive and negative legs of the high voltage bus, each phase of the electric machine coupled between an associated one of the pairs of transistors, wherein the controller controls the transistors to simultaneously connect all three phases of the electric machine to only one of the positive leg or the negative leg of the high voltage bus.

3. The electrified vehicle of claim 1 wherein the controller controls the inverter to simultaneously connect all three phases of the electric machine together to actively short the electric machine.

4. The electrified vehicle of claim 1 wherein the specified elapsed time varies based on rotational speed of the electric machine when the active short request signal is received.

5. The electrified vehicle of claim 1 wherein the specified elapsed time varies based on a time constant of the electric machine, the time constant based on inductance and resistance of the electric machine.

6. The electrified vehicle of claim 5 wherein the time constant corresponds to:

$$\tau = \frac{2L_d L_q}{R_s(L_d + L_q)}$$

where $\tau$ represents the time constant, $L_d$ represents a direct-axis inductance component, $L_q$ represents a quadrature-axis inductance component, and $R_s$ represents resistance of the electric machine.

7. The electrified vehicle of claim 6 wherein the first slew rate varies based on the time constant.

8. The electrified vehicle of claim 1 wherein the controller slews a direct-axis voltage component of the electric machine voltage toward zero at the first slew rate, and a quadrature-axis voltage component of the electric machine voltage toward zero at a third slew rate different from the first slew rate, at least one of the first slew rate and the third slew rate based on rotational speed of the electric machine when the active short request signal is received.

9. The electrified vehicle of claim 1 wherein the controller controls the inverter to actively short the three phases of the electric machine after whichever of (a) and (b) occurs first.

10. The electrified vehicle of claim 1 wherein the controller slews a direct-axis voltage component of the electric machine voltage toward zero at the first slew rate, and a quadrature-axis voltage component of the electric machine voltage toward zero at a third slew rate different from the first slew rate.

11. The electrified vehicle of claim 1 wherein the target short circuit current corresponds to a direct-axis target short circuit current component and a quadrature-axis target short circuit current component corresponding to:

$$i_{d\_ss}^{e} = -\omega_e^2 L_q \lambda_{pm}/(\omega_e^2 L_d L_q + R_s^2) \text{ and}$$

$$i_{q\_ss}^{e} = -R_s \omega_e \lambda_{pm}/(\omega_e^2 L_d L_q + R_s^2)$$

where $i_{d\_ss}^{e}$ represents the direct-axis target short circuit current component, $i_{d\_ss}^{e}$ represents the quadrature-axis target short circuit current component, $\omega_e$ represents angular rotational speed of the electric machine, $L_q$ represents a quadrature-axis inductance component of the electric machine, $L_d$ represents a direct-axis inductance component of the electric machine, $R_s$ represents resistance of the electric machine, and $\lambda_{pm}$ represents a flux linkage of permanent magnets in the electric machine.

12. The electrified vehicle of claim 11 wherein the controller slews a direct-axis current component of the electric machine to the direct-axis target short circuit current component at the second slew rate, and a quadrature-axis current component of the electric machine to the quadrature-axis target short circuit current component at a fourth slew rate different from the second slew rate.

13. A method for controlling an electrified vehicle having an inverter configured to power an electric machine from a traction battery, the method comprising, by a vehicle controller:
controlling the inverter to actively short the electric machine after either a specified elapsed time from receiving an active short request signal, or after completion of electric machine conditioning, the electric machine conditioning including slewing one of electric machine voltage and electric machine current to a respective active short voltage target or active short current target.

14. The method of claim 13 wherein slewing the electric machine voltage comprises slewing a direct-axis voltage component at a first slew rate and a quadrature-axis voltage component at a second slew rate toward zero voltage, the second slew rate different than the first slew rate.

15. The method of claim 14 wherein the first slew rate and the second slew rate are based on rotational speed of the electric machine when the active short request signal is received.

16. The method of claim 15 wherein the target active short current includes a direct-axis current component target and a quadrature-axis current component target corresponding to:

$$i_{d\_ss}^{e} = -\omega_e^2 L_q \lambda_{pm}/(\omega_e^2 L_d L_q + R_s^2) \text{ and}$$

$$i_{q\_ss}^{e} = -R_s \omega_e \lambda_{pm}/(\omega_e^2 L_d L_q + R_s^2)$$

where $i_{d\_ss}^{e}$ represents the direct-axis current component target, $i_{q\_ss}^{e}$ represents the quadrature-axis current component target, $\omega_e$ represents angular rotational speed of the electric machine, $L_q$ represents a quadrature-axis component of inductance of the electric machine, $L_d$ represents a direct-axis component of inductance of the electric machine, $R_s$ represents resistance of the electric machine, and $\lambda_{pm}$ represents a flux linkage of permanent magnets in the electric machine.

17. The method of claim 13 wherein the specified elapsed time is based on at least one of rotational speed of the electric machine and a time constant associated with at least inductance and resistance of the electric machine.

18. A system comprising:
an inverter configured to power a three-phase electric machine from a high voltage battery; and
a controller programmed to control the inverter to simultaneously connect all phase windings of the electric machine together while the electric machine is rotating after a specified elapsed time, the specified elapsed time based on rotational speed of the electric machine or a time constant of the electric machine.

19. The system of claim 18 wherein the controller is further programmed to simultaneously connect all phase windings of the electric machine together after completion of conditioning the electric machine if the completion occurs before the specified time has elapsed, the conditioning including one of slewing electric machine voltage to zero and slewing electric machine current to a target short circuit current.

20. The system of claim 19 wherein:
slewing the electric machine voltage comprises slewing a direct-axis voltage component at a first slew rate and slewing a quadrature-axis voltage component at a second slew rate different than the first slew rate; and
slewing the electric machine current comprises slewing a direct-axis current component and a quadrature-axis current component at a third slew rate.

\* \* \* \* \*